(12) United States Patent
Hasebe et al.

(10) Patent No.: US 7,187,098 B2
(45) Date of Patent: Mar. 6, 2007

(54) AXIAL GAP ROTATING ELECTRICAL MACHINE

(75) Inventors: Masahiro Hasebe, Aichi (JP); Masami Ishikawa, Aichi (JP); Akira Mizuno, Aichi (JP)

(73) Assignee: KabushikiKaisha Equos Research, Tokyo (JP)

( * ) Notice: Subject to any disclaimer, the term of this patent is extended or adjusted under 35 U.S.C. 154(b) by 57 days.

(21) Appl. No.: 11/065,176

(22) Filed: Feb. 24, 2005

(65) Prior Publication Data

US 2005/0194855 A1    Sep. 8, 2005

(30) Foreign Application Priority Data

Mar. 3, 2004 (JP) ............................. 2004-059872
Mar. 18, 2004 (JP) ............................. 2004-078259

(51) Int. Cl.
*H02K 21/12* (2006.01)

(52) U.S. Cl. .................. 310/156.43; 310/268

(58) Field of Classification Search .......... 310/156.38, 310/156.41, 156.43, 156.44, 266, 267, 268
See application file for complete search history.

(56) References Cited

U.S. PATENT DOCUMENTS 3,121,814 A * 2/1964 Kober .................. 310/156.32
6,232,690 B1 * 5/2001 Schmider ............... 310/156.37
6,373,162 B1 * 4/2002 Liang et al. ........... 310/156.53

FOREIGN PATENT DOCUMENTS

JP          10-080113          3/1998

* cited by examiner

*Primary Examiner*—Darren Schuberg
*Assistant Examiner*—Nguyen Hanh
(74) *Attorney, Agent, or Firm*—Bacon & Thomas, LLC

(57) ABSTRACT

An axial gap rotating electrical machine is provided with permanent magnets and cores in a rotor. The permanent magnets are oriented such that magnetization surfaces face in the circumferential direction of the rotor. The cores are arranged alternately with the permanent magnets in the circumferential direction of the rotor. The amount of magnetic flux on the outside in the radial direction of the rotor is made greater than the amount of magnetic flux on the inside in the radial direction of the rotor. As a result, the magnetic flux density at the rotor cores can be made substantially constant in the radial direction of the rotor and torque output with respect to the size of the permanent magnets is improved by preventing magnetic saturation of the cores.

11 Claims, 18 Drawing Sheets

AXIAL GAP ROTATING ELECTRICAL MACHINE

BACKGROUND OF THE INVENTION

1. Field of the Invention

The present invention relates to a rotating electrical machine such as a motor or a generator. More particularly, the present invention relates to an axial gap rotating electrical machine in which a disc-shaped rotor and a stator are oriented opposing one another in the axial direction.

2. Description of the Related Art

A so-called axial gap motor is known in which a stator is arranged opposing end surfaces, in the axial direction, of a disc-shaped rotor across an air gap. This motor obtains rotational driving force from magnetic force acting between the surfaces of the axially opposing rotor and stator. The axial gap motor is advantageous in that it can be made thinner in the axial direction than a so-called radial type motor which has a conventional cylindrical rotor and an annular stator that surrounds the peripheral surface of the rotor.

Presently several types of rotors for axial gap motors are known: a reluctance type having asperities of magnetic material on an end surface that faces a stator, a permanent magnet type which has N-poles and S-poles corresponding to rotational-driving magnetic poles of the stator, and an inducting body type in which inductor rods are aligned in the radial direction (see JP(A) 10-80113, paragraph 0022). In order to construct a thin motor with one rotor and a pair of stators sandwiching the rotor, the motor disclosed in JP(A) 10-80113 employs a structure in which salient poles are arranged on one side of the rotor, and permanent magnets are arranged on the other side of the rotor so that their magnetization surfaces (magnetic poles) face in the axial direction of the rotor. As a result, reluctance torque is generated on the side having the salient poles and permanent magnetic torque is generated on the side having the permanent magnets.

The applicant invented a structure in which cores and permanent magnets are alternately arranged in the circumferential direction on one side of the rotor, with the permanent magnets oriented so that their magnetization surfaces face in the circumferential direction of the rotor. As a result, both reluctance torque and permanent magnet torque are able to be generated on one side of the rotor. Thus this structure makes it possible to increase the torque able to be generated on one rotor side compared with the structure disclosed in JP(A) 10-80113 (hereinafter simply referred to as the "related art"), such that higher torque is able to be generated than is generated with the axial gap motor of the related art.

With this kind of structure in which the magnetization surfaces of the permanent magnets face in the circumferential direction of the rotor, however, the magnetic path from the permanent magnets passes through the cores adjacent to the permanent magnets. As a result, the width of the magnetic path becomes narrower on the inner circumferential side of the rotor than it is on the outer circumferential side, so that the magnetic path at the outer periphery and magnetic path at the inner periphery are uneven. When the magnetic path is narrow at the inner periphery and wide at the outer periphery in this way, the magnetic flux vector from the permanent magnets is not in the circumferential direction, but rather points toward the outer periphery. When a component in the radial direction of the rotor is generated in the magnetic flux vector, that component does not contribute to the driving force which rotates the rotor, so the magnetic force of the permanent magnets cannot be sufficiently reflected in the torque.

Furthermore, with a structure in which the magnetization surfaces of the permanent magnets face in the circumferential direction of the rotor, the magnetic path on the inner circumferential side at the core portion is narrow, resulting in the magnetic flux density becoming too large on the inner circumferential side. As a result, magnetic saturation occurs due to the characteristics of the electromagnetic steel plates used as the core material. When magnetic saturation occurs in this way, the amount of magnetic flux with respect to the amount (volume) of the magnet decreases. As a result, the permanent magnets are unable to be used effectively, which leads to problems such as increases in weight and cost.

In the foregoing related art, the permanent magnets are arranged so that their magnetization surfaces face in the axial direction of the rotor, and there is a back yoke which forms the magnetic path on one of the magnetization surfaces so the aforementioned problems do not occur. However, because the magnetic poles of the permanent magnets face in the direction of the rotational axis, torque as high as that obtained by the foregoing structure according to the invention of the applicant is unable to be output.

SUMMARY OF THE INVENTION

Thus, the main object of the present invention is to make the magnetic flux density in the cores of the rotor substantially constant in the radial direction of the rotor and improve torque output with respect to the size of the permanent magnets by preventing magnetic saturation of the cores in an axial gap rotating electrical machine that enables high torque to be output by facing the magnetization surfaces of the permanent magnets in the circumferential direction of the rotor, as described above.

In order to achieve this object, the invention thus provides an axial gap rotating electrical machine in which a rotor and a stator are arranged facing one another in the axial direction across an air gap, and permanent magnets and cores are arranged in the rotor, wherein the permanent magnets are oriented such that their magnetization surfaces face in the circumferential direction of the rotor, the cores are arranged alternately with the permanent magnets in the circumferential direction of the rotor, and the amount of magnetic flux on the outside in the radial direction of the rotor is set larger than the amount of magnetic flux on the inside in the radial direction of the rotor.

With the foregoing structure, a structure which makes the amount of magnetic flux on the outside in the radial direction of the rotor greater than the amount of magnetic flux on the inside in the radial direction can be realized by making the sectional area per unit length, in the radial direction of the rotor, of the permanent magnets larger on the outer circumferential side than it is on the inner circumferential side.

With the foregoing structure, a structure which makes the amount of magnetic flux on the outside in the radial direction of the rotor greater than the amount of magnetic flux on the inside in the radial direction can also be realized by making the magnetomotive force in each position, in the radial direction of the rotor, of the permanent magnets greater on the outer circumferential side of the rotor than it is on the inner circumferential side of the rotor.

Furthermore, with the foregoing structure, a structure which makes the amount of magnetic flux at the outside in the radial direction of the rotor greater than the amount of magnetic flux at the inside in the radial direction can also be realized by making the magnetic flux density of each position, in the radial direction of the rotor, at the magnetization surfaces of the permanent magnets greater on the outer radial side than it is on the inner radial side.

When the amount of magnetic flux is adjusted by changing the sectional area as described above, the permanent magnets are structured so that, when viewed in the axial direction of the rotor, they are thinner on the inner radial side of the rotor than they are on the outer radial side of the rotor.

Also, when the amount of magnetic flux is adjusted by changing the magnetomotive force, the permanent magnets are structured so that, when viewed in the circumferential direction of the rotor, their width is smaller on the inner radial side of the rotor that it is on the outer radial side of the rotor.

Further, when the amount of magnetic flux is adjusted by changing the amount of magnetization, the permanent magnets are structured so that the amount of magnetization in the radial direction of the rotor is less on the inner radial side than it is on the outer radial side.

In all of the above cases, the magnetic flux density in the cores of the rotor is preferably made substantially constant in the radial direction of the rotor.

According to the axial gap rotating electrical machine of the present invention, the amount of magnetic flux on the outside in the radial direction of the rotor is set to be larger than the amount of magnetic flux on the inside in the radial direction of the rotor, which enables the magnetic flux density in the cores of the rotor to be made substantially constant in the radial direction of the rotor, as well as improves the torque output with respect to the size of the permanent magnets by preventing magnetic saturation of the cores.

DETAILED DESCRIPTION OF THE PREFERRED EMBODIMENTS

In the present invention, the magnetic flux density at the core of the rotor is preferably made substantially constant in the radial direction of the rotor. The reason why this is effective is described below.

Figure 1:
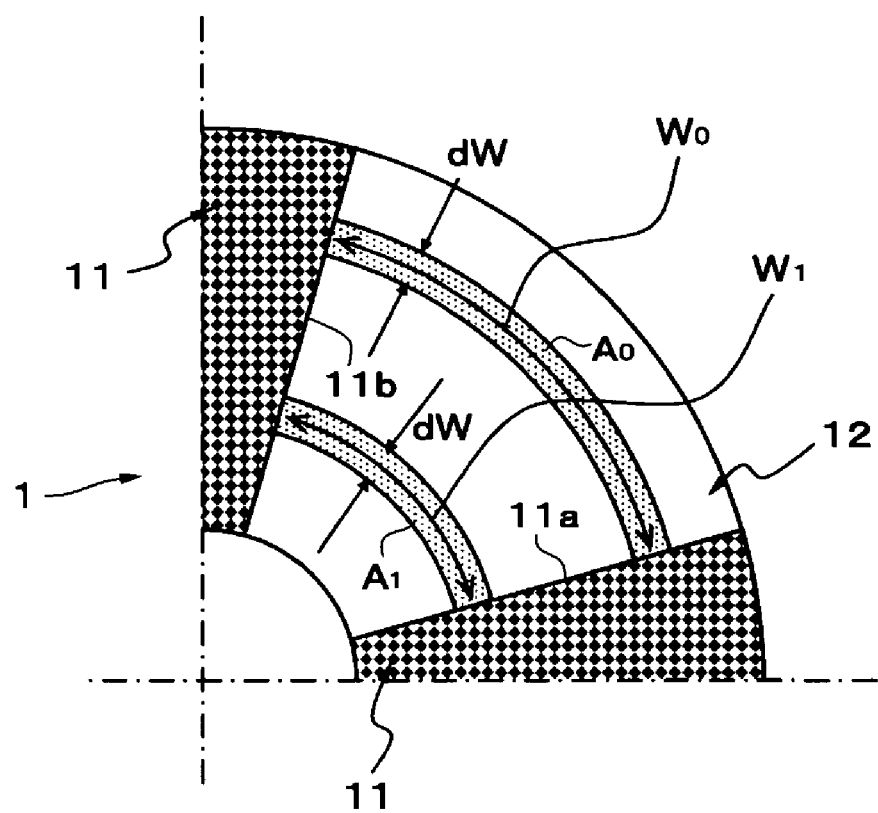
FIG. 1 is a representational partial plan view of a structure of a rotor of an axial gap rotating electrical machine according to the present invention.

FIG. 1 is a partial plan view of a rotor when viewed from the side facing a stator. As shown in the drawing, the area of portions A0 and A1 indicated by fine dots in the drawing is larger toward the outer radial side of the core 12. In the rotor which has magnetization surfaces oriented in the circumferential direction and magnets arranged alternately with the cores in the circumferential direction, the magnetic flux generated from the permanent magnets passes through cores 12. Here, the cores are generally fan-shaped, so that the circumferential length (magnetic path width) W0 of the extremely small length dW in the radial direction of the portion (on the outside in the radial direction) denoted by reference character A0 is larger than the circumferential length (magnetic path width) W1 of the extremely small length dW in the radial direction of the portion (on the inside in the radial direction) denoted by reference character.

The magnetic flux density in the cores is inversely proportionate to the magnetic path width. Therefore, if the magnetic flux density at the magnetization surfaces 11a, 11b of the permanent magnets 11 is constant and does not fluctuate in the radial direction, and the thickness of the permanent magnet 11 in the axial direction of the rotor (i.e., in the direction perpendicular to the paper on which the drawing is drawn) is also constant, the magnetic flux density in the cores becomes larger at the portion (on the inside in the radial direction of the rotor) denoted by reference character than it is at the portion (on the outside in the radial direction of the rotor) denoted by reference character A0.

If the magnetic path width in the circumferential direction of the cores (i.e., the length in the circumferential direction of the cores) is changed by changing its radial position, the magnetic flux density produces a crude density in the radial direction, and the magnetic flux density actually shifts to the crude side. That is, the magnetic flux density vector generated by permanent magnets 11 generates a component in the radial direction. Since this radial component of the magnetic flux density does not contribute to the force which rotates the rotor, that amount of magnetic force is wasted. Therefore, it is effective to set the magnetic flux density of the cores at the extremely small length dW in the radial direction to be constant and not fluctuate in the radial direction, as described above.

The present invention is characterized by the fact that the rotor is provided with permanent magnets in which the amount of magnetic flux on the outside in the radial direction is set larger than the amount of magnetic flux on the inside in the radial direction. The magnetic flux density in the cores is proportionate to the amount of magnetic flux generated by the permanent magnets, so the decrease in magnetic flux density on the outside of the rotor due to the magnetic path width which is wider on the outside of the rotor than it is on the inside of the rotor, is offset by the increase in the amount of magnetic flux generated by the permanent magnets on the outside of the rotor. As a result, the magnetic flux density in the cores can be made substantially constant in the radial direction, i.e., the magnetic flux vectors generated from the permanent magnets 11 can all be made to point in the circumferential direction, so the magnetic force of the permanent magnets 11 can be utilized efficiently as torque.

Here, the amount of magnetic flux generated by the permanent magnets on the outside of the rotor can be set large by, for example, a) making the permanent magnets thicker in the axial direction on the outer radial side than they are on the inner radial side b) making the permanent magnets wider in the circumferential direction on the outer radial side than they are on the inner radial side, c) making the amount of magnetization of the permanent magnets greater on the outer radial side than it is on the inner radial side, or d) making the magnetomotive force of the permanent magnets greater on the outer radial side than it is on the inner radial side.

Furthermore, when the permanent magnets of the rotor generate a uniform magnetic flux in the radial direction, there is a possibility that magnetic saturation may occur due to the small magnetic path width of the cores on the inside in the radial direction of the rotor, even if magnetic saturation does not occur in the cores due to the large magnetic path width of the cores on the outside in the radial direction. With the present invention, however, the magnetic flux density within the rotor cores can be made constant in the radial direction. That is, magnetic saturation will not occur in the cores. Thus, according to the present invention, the magnetic force of the permanent magnets can be effectively used for the rotational driving force.

[First Embodiment]

Figure 2:
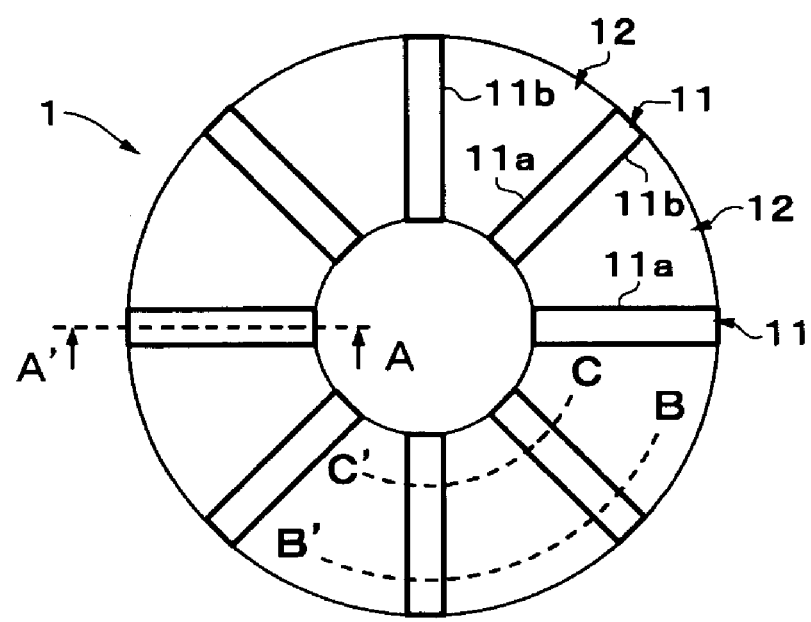
FIG. 2 is a representational plan view of a structure according to a first exemplary embodiment.
Figure 3:
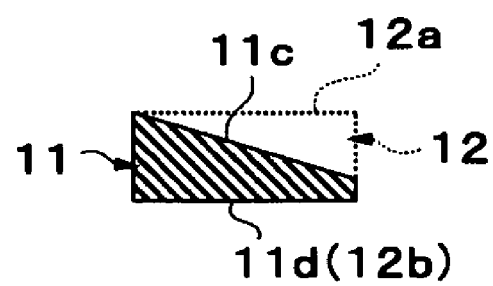
FIG. 3 is a sectional view of a cross-section taken along line A–A' in FIG. 2.
Figure 4:
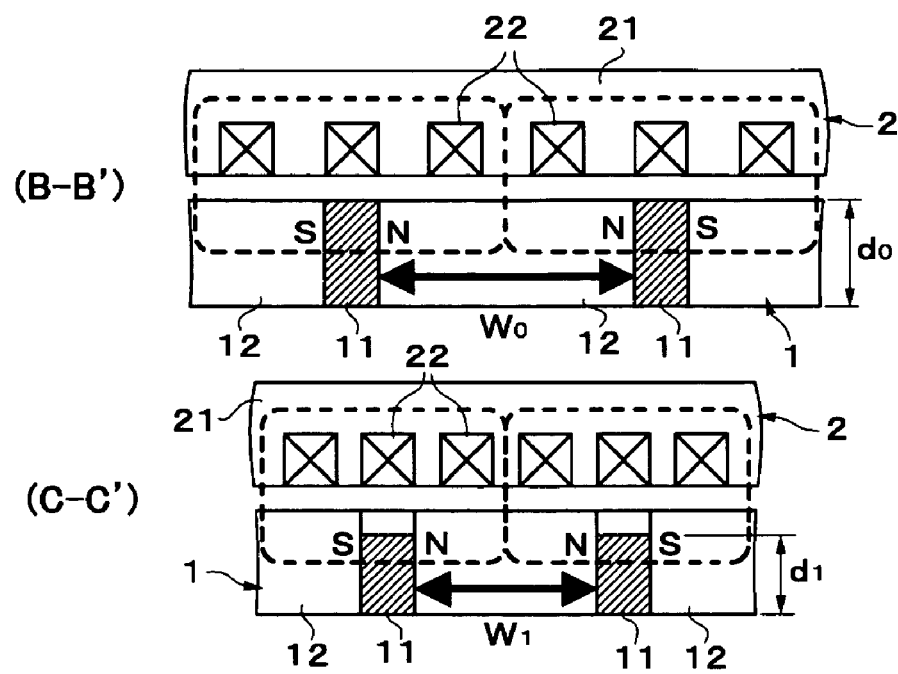
FIG. 4 is an expanded sectional view of cross-sections taken along lines B–B' and C–C' in FIG. 2, expanded and arranged vertically.

Exemplary embodiments of the present invention will hereinafter be described with reference to the appended drawings. FIGS. 2 to 4 show a first exemplary embodiment. This exemplary embodiment realizes a structure in which the amount of magnetic flux on the outside in the radial direction of a rotor 1 is made greater than the amount of magnetic flux on the inside in the radial direction by making the sectional area (S) per unit length (i.e., the dW), in the radial direction of the rotor, of permanent magnets (hereinafter simply referred to as "magnets" in the embodiments) 11 larger at the outer circumferential side than it is at the inner circumferential side. More specifically, the magnets 11 in this exemplary embodiment are made thinner, when viewed in the axial direction of the rotor 1 (i.e., the direction perpendicular to the paper on which the drawing is drawn), on the inner radial side of the rotor than they are on the outer radial side of the rotor.

FIG. 2 is a representational plan view of the rotor as viewed from side that faces the stator. FIG. 3 is a representational sectional view of a cross-section taken along line A–A' in FIG. 2. FIG. 4 is a representational sectional view of cross-sections taken along lines B–B' and C–C' in FIG. 2. As shown in FIG. 2, the magnets 11 and cores 12 are arranged in the rotor 1 in this example. The magnets 11 are oriented such that magnetization surfaces 11a, 11b face in the circumferential direction of the rotor, and like poles face each other, i.e., N-poles face N-poles and S-poles face S-poles, as shown in FIG. 4. The cores 12 are arranged alternately with the magnets 11 in the circumferential direction of the rotor. The magnets 11 are rod-shaped with rectangular cross sections and have a constant width in the circumferential direction of the rotor.

In order to make the area of the magnetization surfaces larger on the outer peripheral side than it is on the inner peripheral side, each magnet 11 is made thinner on the inner radial side than it is on the outer radial side (i.e., the length of each magnet 11 in the axial direction of the rotor is made shorter on the inner radial side than it is on the outer radial side), as shown in FIG. 3. That is, the thickness of the magnets 11 on the outermost radial side (the left side in the drawing) is the same as the thickness of the cores 12. From the outer radial side toward the inner radial side, the magnets 11 become thinner, with the surface 11c of the magnets 11 separating from the surface 12a of the cores 12, slanting so as to become closer to a back surface 11d of the magnets 11 which is level with a back surface 12b of the cores 12. The thickness of the rotor cores 12 is the same at the inner radius as it is at the outer radius to ensure reluctance torque.

According to the structure of this exemplary embodiment, when the magnetic path width is made W and the magnet thickness is made d, the magnetic flux density B of the cores 12 in the range of the extremely small length dW in the radial direction of the rotor on the side of the cores 12 that faces the stator, becomes $$B = k(d \times dW / W \times dW)$$

where k is the magnetic flux density at the magnet magnetization surfaces 11a, 11b. Here, the term d×dW represents the area by the product of the extremely small length dW, in the radial direction, of the magnets 11 and the length d in the direction of thickness of the rotor. Accordingly, k×d×dW represents the amount of magnetic flux generated by the magnetization surfaces of that area. This amount of magnetic flux passes through the magnetic path width W in the circumferential direction and the extremely small length dW in the radial direction of the rotor surface of the cores 12, which is why the magnetic flux density B is obtained by the foregoing equation.

Now, as shown in FIG. 4, when the magnetic path width on the outer radial side is made W0 and the magnet thickness on the outer radial side is made d0, the magnetic flux density of the cores on the outer radial side becomes $$B0 = k(d0 / W0)$$

and when the magnetic path width on the inner radial side is made W1 and the magnetic thickness on the inner radial side is made d1, the magnetic flux density on the inner radial side of the cores becomes $$B1 = k(d1 / W1).$$

Accordingly, since the ratio B0/B1 of these magnetic flux densities equals (d0/d1)×(W1/W0) and the ratio of the magnetic path widths (W1/W0) is less than 1, the ratio of the magnetic thicknesses (d0/d1) must be greater than 1 in order to have the magnetic flux densities on the inner radial side and the outer radial side be equal. Therefore, in this exemplary embodiment, the magnet thickness on the inner radial side is made smaller than the magnet thickness on the outer radial side.

With this structure, the magnetic path width W is proportionate to its radius, so if the thickness d, in the axial direction of the rotor, of the magnets 11 is made larger in proportion to the radius, the ratio of the magnet thicknesses can be used to reduce the magnetic flux on the inner radial side to the point where magnetic saturation will not occur in the core portion on the inner radial side. Further, by setting the ratio of the magnet thicknesses to a predetermined value, the magnetic flux densities on the inner radial side and the outer radial side can be made equal and all of the magnetic flux vectors can be made to point in the circumferential direction.

Figure 5:
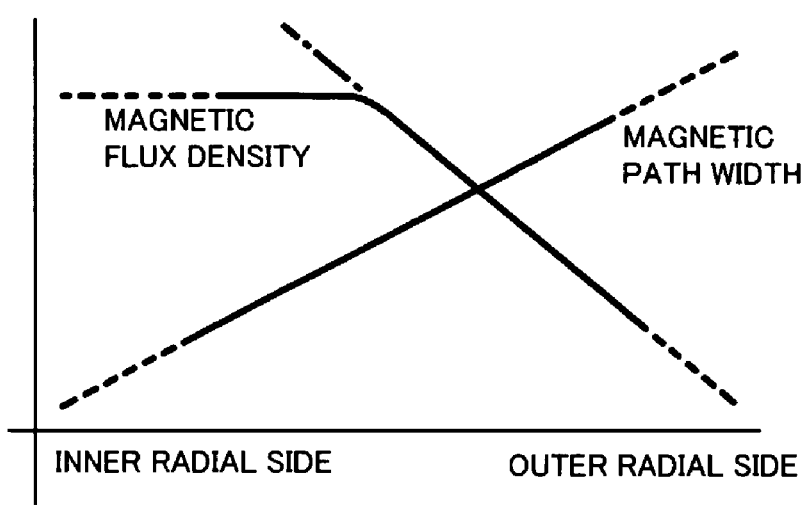
FIG. 5 is a graph illustrating the relationship between magnetic path width and magnetic flux density when the amount of the magnetic flux of the permanent magnets is constant.
Figure 6:
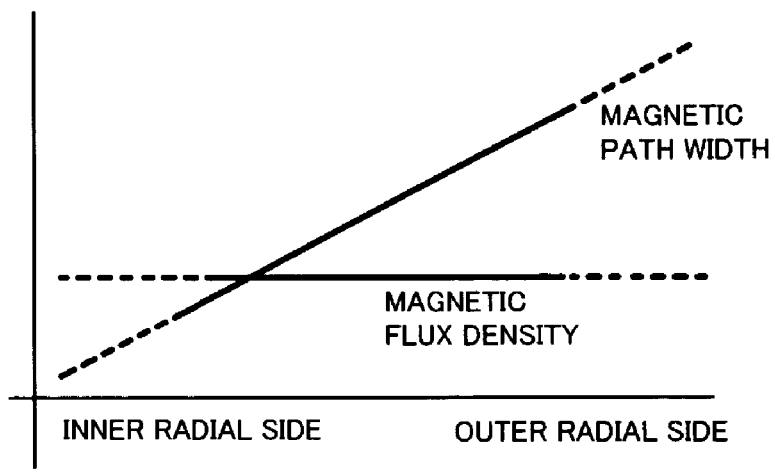
FIG. 6 is graph illustrating the relationship between the magnetic path width and the magnetic flux density when the amount of magnetic flux of the permanent magnets has been reduced on the inner radial side of the rotor.

Next, FIGS. 5 and 6 are graphs illustrating the relationship between the magnetic path width and the magnetic flux density in the core portion. FIG. 5 shows a case in which the magnetic flux density of the magnets is constant. In this case, the magnets are essentially supposed to be able to generate a linear magnetic flux density, as shown by the alternate long and short dash line in the drawing, in the cores on the inner radial side of the rotor as well. However, the magnetic path width is narrow on the inner radial side, so magnetic saturation occurs and the magnetic flux density on the inner radial side of the cores peaks out.

In contrast, FIG. 6 shows a case in which the magnetic flux density of the magnets is reduced on the inner radial side. In this case, when a reduction amount of the magnetic flux density of the magnets is set so that the decrease in the magnetic flux density of the magnets and the decrease in the magnetic path width offset each other, a constant magnetic flux density can be generated in the cores. As a result, not only can magnetic saturation on the inner radial side of the cores be prevented, but also all of the magnetic flux vectors can be made to point in the circumferential direction.

The method to reduce the amount of magnetic flux according to the first exemplary embodiment enables the reduction of the magnetic flux to be directly reflected in the reduction of the magnet volume because the magnetic flux reduction amount and the magnet volume reduction amount are substantially proportional. Thus this method is highly effective for reducing the weight of the rotating electrical machine and reducing costs compared with the methods according the other exemplary embodiments to be described later.

Figure 7:
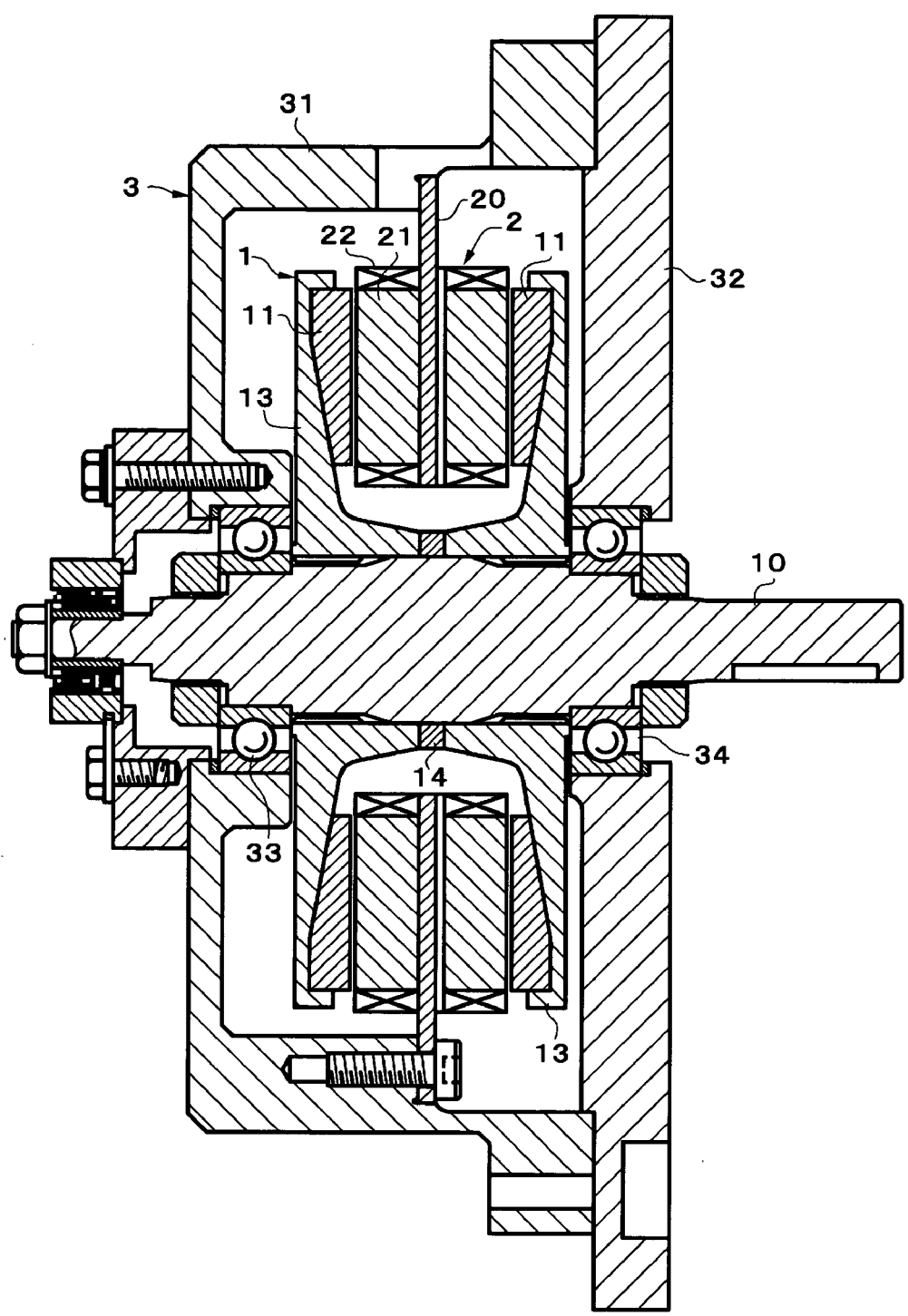
FIG. 7 is a sectional view of the structure of the first exemplary embodiment in greater detail when it is a double rotor type axial motor.

FIG. 7 shown next is a sectional view of the detailed structure according to the first exemplary embodiment in the case of a double rotor type axial gap motor. As shown in the drawing, the rotor 1 and a stator 2 which together form the rotating electrical machine are housed in a case 3. The case 3 includes a case portion 31 which houses the rotor 1 and the stator 2, and a cover portion 32 which covers the open end of the case portion 31.

The magnets 11 and cores, not shown, of the rotor 1 are supported in a rotation stopping fashion by spline engagement with a rotor shaft 10 via a pair of support members 13 which are made of nonmagnetic material. A spacer 14 is disposed between the inner radial side of the pair of support members 13 and a hub portion fitted on the outer periphery of the rotor shaft 10. This spacer 14 fixes, via the support members 13, the distance between the opposing magnets 11 and cores which are supported by respective support members. The rotor shaft 10 is rotatably supported at one end side via bearings 33 in a hole portion of a vertical wall of the case portion 31 and at the other end side via bearings 34 in a hole portion of a vertical wall of the cover 32.

In this example, the entire stator 2 is annular, with fan-shaped segments in which coils 22 are wound around stator cores 21, fixed, arranged in the circumferential direction, to a nonmagnetic support member 20. The stator 2 is fixed to the case 3 via the support member 20 by the outer periphery of the support member 20 being fastened with a bolt to a stepped portion of the case portion 31.

The positional relationship, in the circumferential direction of the rotor, of the magnets 11 and the cores of the rotor 1 in this structure is as described above. As shown in the drawing, each magnet 11 is shaped so that its thickness in the axial direction of the rotor gradually decreases in the radial direction of the rotor. In this example, the magnets 11 are shaped such that the air gap sides of the magnets 11 of the rotor 1 that face the stator 2 are parallel with the air gap and the back sides of the magnets 11 of the rotor 1 are slanted (i.e., such that surface 11c of the magnets 11 on the side of the rotor 1 that faces the stator 2 is level with the surface of the cores 12 of the rotor 1 and the back sides 11d of the magnets 11 are slanted), which differs from the exemplary embodiment explained in principle before. The effects, however, are the same as is evident from the prior description of the operation.

One effect specific to this particularly detailed structure is the advantage of ease of maintaining the air gap. This is achieved by the back sides of the magnets 11 being angled or slanted, as described above, which results in the support members 13 of the support portions of the magnets 11 being thicker in the axial direction toward the inner radial side, thus making it easier to ensure the rigidity of the support members 13.

[Second Embodiment]

Figure 8:
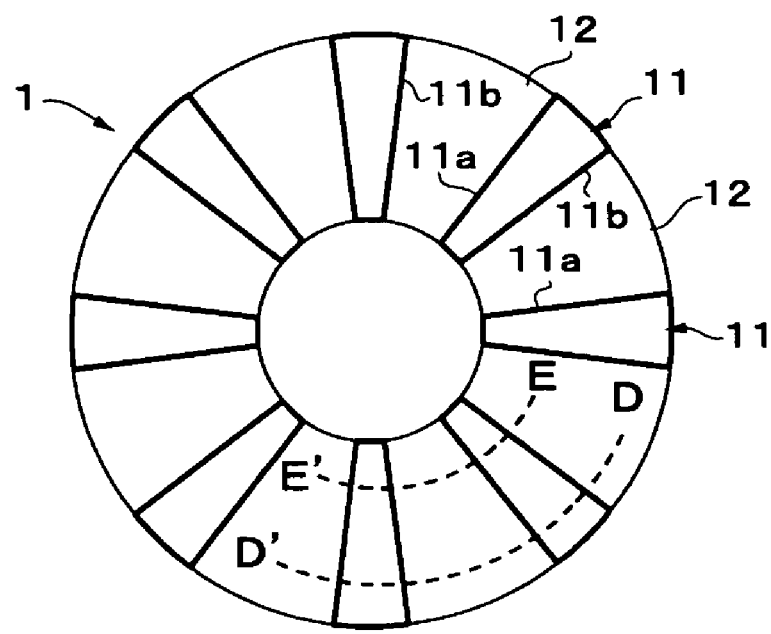
FIG. 8 is a representational plan view of a structure according to a second exemplary embodiment.
Figure 9:
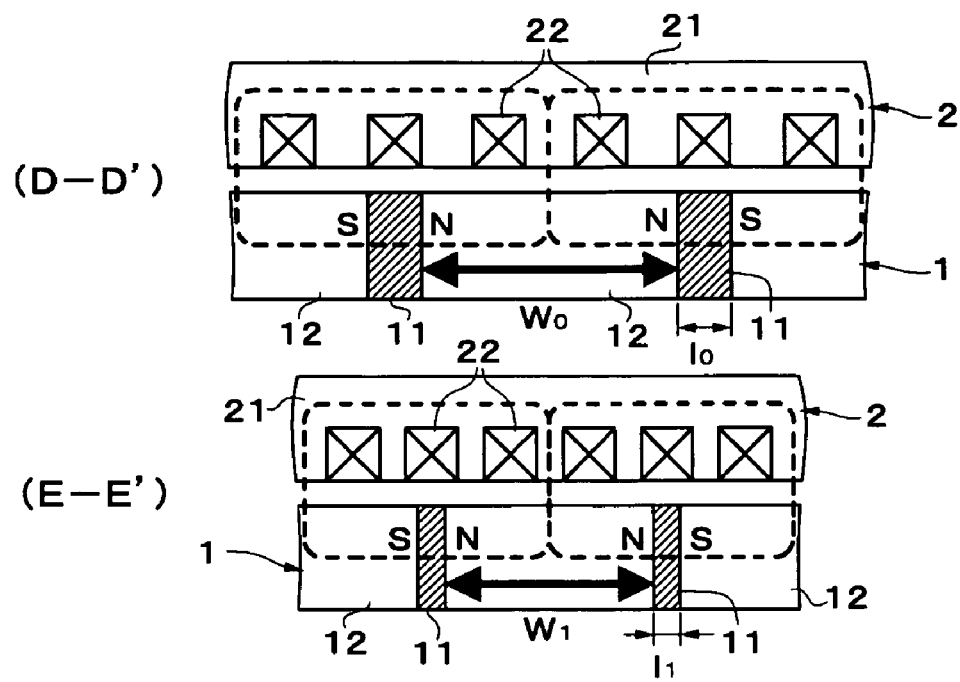
FIG. 9 is an expanded sectional view of cross-sections taken along lines D–D' and E–E' in FIG. 8, expanded and arranged vertically.

Next, a second exemplary embodiment shown with reference to FIGS. 8 and 9 realizes a structure in which the amount of magnetic flux on the outside in the radial direction of the rotor 1 is made larger than the amount of magnetic flux on the inside in the radial direction by making a magnetomotive force (F) in each position, in the radial direction of the rotor, of the magnets 11 greater at the outer circumferential side of the rotor than it is at the inner circumferential side of the rotor. More specifically, the magnets 11 in this example are structured so that their widths, when viewed from the circumferential direction of the rotor 1, are made smaller on the inner radial side of the rotor than they are on the outer radial side of the rotor.

FIG. 8 is a representational plan view of the rotor as viewed from the side that faces the stator. FIG. 9 is a representational sectional view of cross-sections taken across lines D–D' and E–E' of FIG. 8. All of the basic structure in this example is the same as that of the first exemplary embodiment, so in the following description, corresponding members will be denoted by like reference numerals and only the differences from the foregoing exemplary embodiment will be described. As shown in FIG. 8, the magnets 11 in this example are also fan-shaped with rectangular cross-sections and have a constant thickness in the axial direction of the rotor.

In order to make the magnetomotive force (F) in the radial direction of the rotor greater at the outer circumferential side of the rotor than it is at the inner circumferential side of the rotor, the width l of each of the magnets 11, when viewed from the circumferential direction of the rotor 1, is made smaller on the inner radial side of the rotor than it is on the outer radial side of the rotor, as shown in FIG. 9. That is, the thickness in the radial direction of each magnet 11 is the same as the thickness of the cores 12, but the width, in the circumferential direction, of each magnet 11 is made narrower by angling the magnetization surfaces 11a, 11b so that they are closer to one another on the inner radial side than they are on the outer radial side. In this case as well, the thickness of the rotor cores 12 is made the same at the both the inner and outer radial sides in order to ensure reluctance torque.

In this exemplary embodiment, the material and magnetization surfaces of the magnets 11 are the same on the outer radial side as they are on the inner radial side, so the coersive force of the magnets is also the same on the outer radial side as it is on the inner radial side. Here, the magnetomotive force F (A) of the magnets 11 is the product of the coersive force Hc (kA/m) and the thickness I (mm) between the magnetization surfaces. That is, $$F = Hc \times I$$

As shown in this exemplary embodiment, when the width (which is the same as the thickness between magnetization surfaces) I1 of the magnets 11 on the inner radial side of the rotor is made narrower than the width (i.e., the thickness between magnetization surfaces) I0 of the magnets 11 on the outer radial side of the rotor, the I of the inner radial side becomes smaller than the I of the outer radial side in the above equation. Accordingly, the magnetomotive force F on the inner radial side becomes smaller than it is on the outer radial side.

Generally, the magnetic flux $\phi$(Wb) can be expressed as follows by the magnetomotive force F (A) and the magnetic resistance Rm (A/Wb).

$$\phi = F/Rm$$

Accordingly, when the width of the magnets on the inner radial side is made narrower than it is on the outer radial side, the magnetomotive force F on the inner radial side becomes smaller, resulting in the magnetic flux $\phi$ becoming smaller on the inner radial side than it is on the outer radial side.

Similar to the first exemplary embodiment, in the second exemplary embodiment as well, the magnetic flux density at the core portion can be made uniform on the outer radial side as well without the magnetic flux density rising on the inner radial side which has the narrower magnetic path width W, by making the magnetic flux $\phi$ on the inner radial side smaller than it is on the outer radial side.

In the structure of the second exemplary embodiment as well, the magnetic flux density of the core portion is substantially proportional to the magnetomotive force of the magnets. Therefore, the magnetic flux density of the core portion can be made the same at the inner and outer radial sides by adjusting the magnetomotive force of the magnets, which can be done by adjusting the width of the magnets.

[Third Embodiment]

Figure 10:
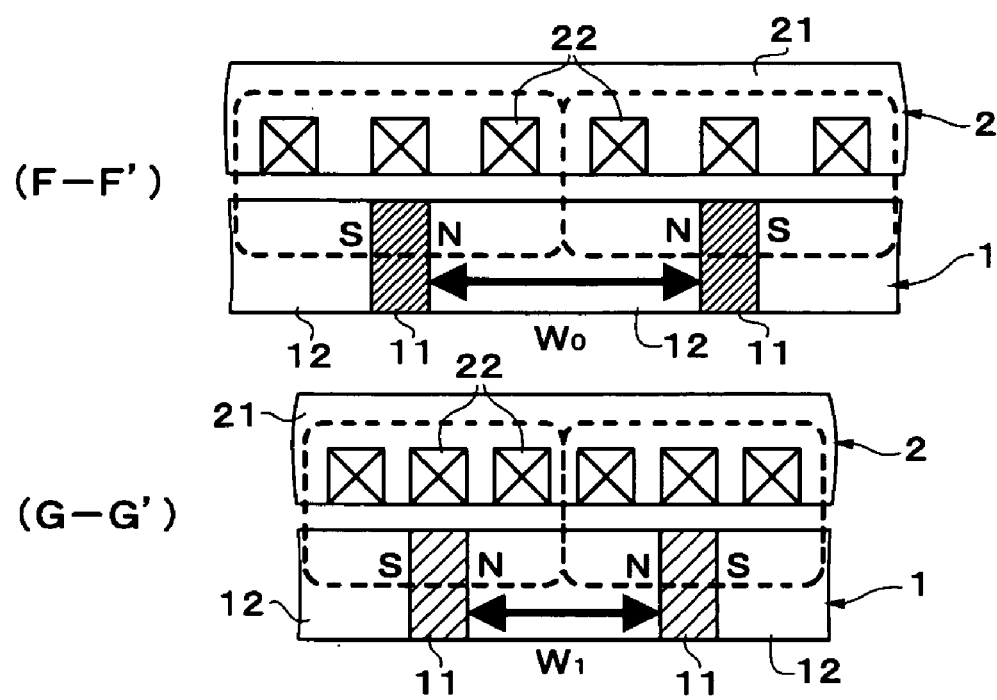
FIG. 10 is an expanded sectional view of cross-sections in the circumferential direction of an outer radial side and an inner radial side of an axial gap rotating electrical machine according to a third exemplary embodiment.

Next, a third exemplary embodiment shown with reference to FIG. 10 realizes a structure in which the amount of magnetic flux at the outside in the radial direction of the rotor 1 is made larger than the amount of magnetic flux at the inside in the radial direction of the rotor 1 by making the magnetic flux density (B), in the radial direction of the rotor, at the magnetization surfaces of the magnets greater on the outer radial side than it is on the inner radial side. More specifically, the magnets 11 in this example are structured such that the amount of magnetization in the radial direction of the rotor is less on the inner radial side than it is on the outer radial side.

FIG. 10 is a representational sectional view showing the rotating electrical machine cut at the same portions as the cross-sections taken along lines B–B' and C–C' in the representational plan view (FIG. 2) of the first exemplary embodiment (in this example, the cross-sections are denoted by F–F' and G–G'). All of the basic structure in this example as well is the same as that of the foregoing first exemplary embodiment, so in the following description, corresponding members will be denoted by like reference numerals and only the differences from foregoing exemplary embodiment will be described. As shown in FIG. 10, the magnets 11 in this example are rod-shaped with rectangular cross-sections, and have a constant thickness in the axial direction of the rotor and a constant width in the circumferential direction of the rotor.

In order to make the magnetic flux density (B), in the radial direction of the rotor, at the magnetization surfaces of each magnet 11 greater on the outer radial side than it is on the inner radial side, the magnets 11 in this example are structured such that the amount of magnetization in each position in the radial direction of the rotor is less on the inner radial side than it is on the outer radial side (the amount of magnetization is indicated by the spacing of the hatching lines in the drawing; i.e., the closer the hatching lines the greater the magnetization, and the farther apart the hatching lines the less magnetization). That is, thickness in the radial direction of the magnets 11 is the same as the thickness of the cores 12, the width from the outer radial side to the inner radial side is constant, and only the amount of magnetization at each portion changes. In this case as well, the thickness of the rotor cores 12 is made the same at the inner and outer radial sides in order to ensure reluctance torque.

In this exemplary embodiment, making the amount of magnetization smaller on the inner radial side than it is on the outer radial side makes the residual magnetic flux density Br (T) smaller on the inner radial side than it is on the outer radial side. When the residual magnetic flux density Br is made small in this way, the magnetic flux $\phi$(Wb) is such that $$\phi = B \times S$$

if the magnetic flux density of the magnets when the magnetic circuit is closed is made B (T) and the sectional area of the magnets is made S (M2). In this example, the magnetic flux density B is smaller on the inner radial side than it is on the outer radial side of the magnets, so the magnetic flux $\phi$ is smaller on the inner radial side than it is on the outer radial side.

Just as in the first exemplary embodiment, in the third exemplary embodiment as well, the magnetic flux density at the core portion can be made uniform on the outer radial side as well without the magnetic flux density rising on the inner radial side which has the narrower magnetic path width W, by making the magnetic flux $\phi$ on the inner radial side smaller than it is on the outer radial side.

Also, with the structure of the third exemplary embodiment, the magnetic flux density of the core portion is substantially proportional to the magnetomotive force of the magnets. Therefore, the magnetic flux density of the core portion can be made the same on the inner radial side as it is on the outer radial side by adjusting the magnetomotive force of the magnets, which can be done by adjusting the amount of magnetization of the magnets.

Thus, according to the structures of the first to third exemplary embodiments described above, it is possible to increase the torque that is able to be generated by a single rotor side, thus enabling high torque to be obtained. Furthermore, an invention that enables the torque that can be generated by a single rotor side to be increased, thus enabling high torque to be obtained, even if another structure is used, will now be described using a fourth exemplary embodiment and a fifth exemplary embodiment.

Presently several types of rotors for axial gap motors are known: a reluctance type having salient poles of magnetic material on an end surface of the rotor which opposes a stator, and a permanent magnet type in which permanent magnets are arranged on a rotor, with their magnetic poles facing in the axial direction, corresponding to the rotation-driving magnetic poles on the stator. JP(A) 10-80113 discloses one example of an axially symmetrical thin double rotor type motor in which one stator is sandwiched between a pair of rotors, which is based on this kind of permanent magnet type axial gap motor.

The applicant invented a rotating electrical machine which is a combination of a permanent magnet type and a reluctance type which is different from that presently known. The rotating electrical machine according to this invention employs a structure in which cores and permanent magnets are arranged alternately in the circumferential direction on one side of the rotor, and the permanent magnets are oriented such that their magnetic poles face in the circumferential direction of the rotor. Accordingly, the motor is able to generate both reluctance torque and permanent magnet torque with a single side of the rotor. As a result, this structure enables the torque that can be generated on a single side of the rotor to be increased, making it possible to obtain greater torque than can be obtained from an axial gap motor of the related art.

However, since this structure is not a single piece in which the cores of each pole of the rotor are connected to a back yoke, as is the structure of the related art, but rather a structure that is divided for each pole, it is necessary to provide a support member to integrate the rotor cores and the permanent magnets. Moreover, since this structure offers the advantage of compactness due to the elimination of the back yoke which is made possible by facing the magnetic poles of the permanent magnets in the circumferential direction, just how compact the support member of the rotor cores and permanent magnets can be made becomes an issue. If the support member is the same size as the back yoke, the advantage of compactness is lost.

Also, one attachment method that usually comes to mind is the method in which the cores and the permanent magnets are adhered to the support member. With this method, however, problems of durability can be anticipated with respect to the attraction force acting on the cores and centrifugal force acting on both the cores and the permanent magnets, arising from a decrease in adhesion force due to heat. In view of this, a support structure which is both compact and has superior resistance to attraction force and centrifugal force is necessary.

The main object of the fourth and fifth exemplary embodiments of the present invention is to realize, in an axial gap rotating electrical machine according to the invention of the applicant, a compact and extremely strong rotor structure that can withstand attraction force and centrifugal force acting on independent rotor cores and permanent magnets while utilizing the compact characteristic in which the rotating electrical machine does not require a specific back yoke.

In order to achieve this object, the present invention provides an axial gap rotating electrical machine provided with a rotor 1 in which are disposed permanent magnets 11 and cores 12, and a stator 2 which sandwiches an air gap G in the axial direction with end surfaces of the rotor and faces those end surfaces, which is mainly characterised in that the rotor has a support member 13 which supports, by insertion, a plurality of separated cores and connects them to a rotating shaft 10; the permanent magnets are attached to the support member between the cores in the circumferential direction of the rotor and oriented such that their magnetic poles face in the circumferential direction of the rotor; and the support member has an annular portion 13b which supports an outer periphery of the cores in order to prevent the cores from flying outward due to centrifugal force that acts on them.

In this structure, the support member has spoke portions 13c that connect the annular portion and a hub portion 13a which fits onto the rotating shaft. The spoke portions extend radially in spaces in the radial direction of the rotor which are surrounded by adjacent cores and the permanent magnets disposed between those cores, and are therefore effective structures for ensuring that adjacent cores do not contact one another.

Another effective structure is one in which the support member has spoke portions that connect the annular portion and a hub portion which fits onto the rotating shaft, the permanent magnets are arranged along the spoke portions, and the cores are arranged separated from one another in the spaces that are surrounded by the hub portion, the spoke portions, and the annular portion.

In all of these structures, the cores are preferably provided with retaining portions 12a which abut against the support member at the back side of the surface where the support member faces the rotor in order to prevent the cores from slipping out in the direction that would reduce the air gap, due to the attraction force of the stator acting on the cores.

In this case, the permanent magnets are preferably attached to the surfaces of the spoke portions on the side that faces the stator.

It is also effective to have the permanent magnets be attached to the spoke portions on the back sides of the surfaces that oppose the stator, and the cores be provided with retaining portions 12b which abut against the back sides of the surfaces of the permanent magnets that are attached to the spoke portions in order to prevent the cores from slipping out in the direction that would reduce the air gap, due to the attraction force of the stator acting on the cores.

When any of these structures are employed, the retaining portions of the cores preferably include protrusions that extend out from the cores in either the radial direction or the circumferential direction of the rotor.

It is also effective to have the permanent magnets be structured such that their thickness in the axial direction decreases toward the inside in the radial direction of the rotor, and the spoke portions of the support member be such that their thickness in the axial direction increases toward the inside in the radial direction of the rotor.

According to the axial gap rotating electrical machines described in the fourth and fifth exemplary embodiments of the present invention, it is possible to achieve a compact rotor structure which integrates permanent magnets and rotor cores that are divided into the same number as there are poles and connects them to a rotating shaft, without a back yoke, using a support member. Also, using a configuration in which the annular portion of the outer periphery of the support member is connected to the hub portion by the spoke portions obviates the need for a back yoke shaped component that adds even more thickness to the thickness of the cores in the axial direction. As a result, the rotor cores and permanent magnets can be prevented from flying out due to centrifugal force without making the rotor any thicker than the cores.

Furthermore, with a structure that provides retaining portions on the cores, the cores of the rotor are prevented from being pulled in a direction that would close the air gap due to the attraction force of the stator, so the air gap can be structurally and reliably maintained without requiring a mechanism for attaching the cores to the support member.

The hub portion of the support member of the rotor in the fourth and fifth exemplary embodiments of the present invention is preferably made as long as possible so that the length of the portion that fits with the rotating shaft is increased within the length in the axial direction of the rotor cores in order to reduce wobbling of the end surfaces of the rotor that oppose the air gap and the end surfaces of the stator. It is also effective to arrange the spoke portions so that they connect the hub portion and the annular portion through the spaces formed between the cores and the permanent magnets. The reason for employing this kind of spoke portion arrangement is as follows.

In an axial gap rotating electrical machine, the rotor cores must be thick enough in the axial direction so that magnetic saturation does not occur. In a rotating electrical machine which is the premise of the present invention, in which permanent magnets are oriented such that their magnetic poles face in the circumferential direction, there is a tendency for the cores to be thicker than the permanent magnets in the axial direction of the rotor. Consequently, if the thickness of the cores is determined so that magnetic saturation will not occur, the cores end up being thicker in the axial direction than the permanent magnets. Therefore, if only the magnetic characteristics are taken into consideration, spaces are formed in the portions surrounded by the magnets and adjacent cores in the axial direction of the rotor. The present invention is mainly characterised in that it uses magnetic specific excess space as a structure to strongly support the rotor by arranging spoke portions which support the annular portion of the rotor in the spaces formed by these magnetic characteristics.

Employing this structure enables the rotor support member to be a rotating electrical machine structure which is extremely strong against attraction force and centrifugal force, without sacrificing the compactness achieved by embedding the magnets, due to the fact that it is kept within the thickness, in the axial direction, of the rotor cores.

[Fourth Embodiment]

Figure 11:
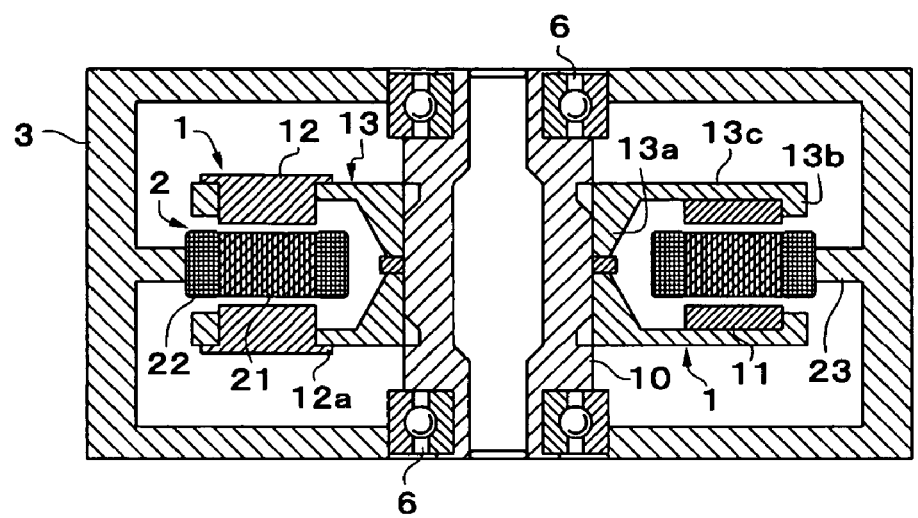
FIG. 11 is a representational sectional view of a double rotor type axial gap rotating electrical machine according to the first exemplary embodiment according to one application of the present invention.
Figure 12:
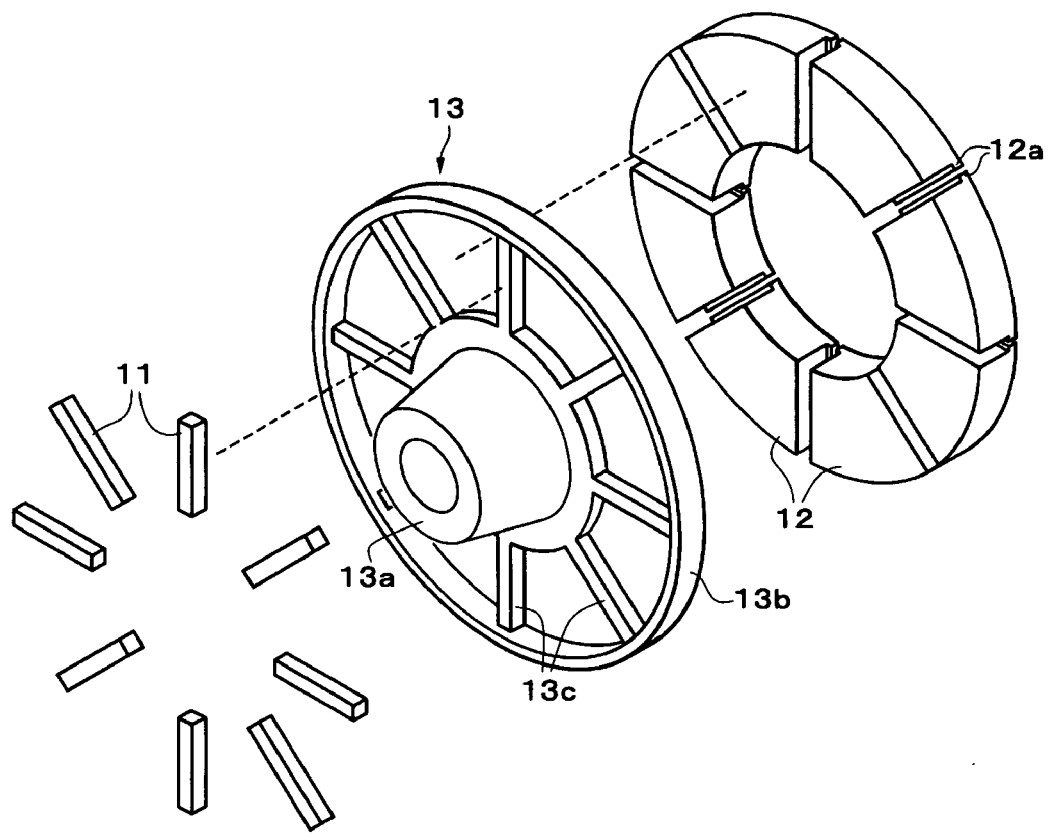
FIG. 12 is an exploded perspective view of a structure of a rotor of the rotating electrical machine.
Figure 13:
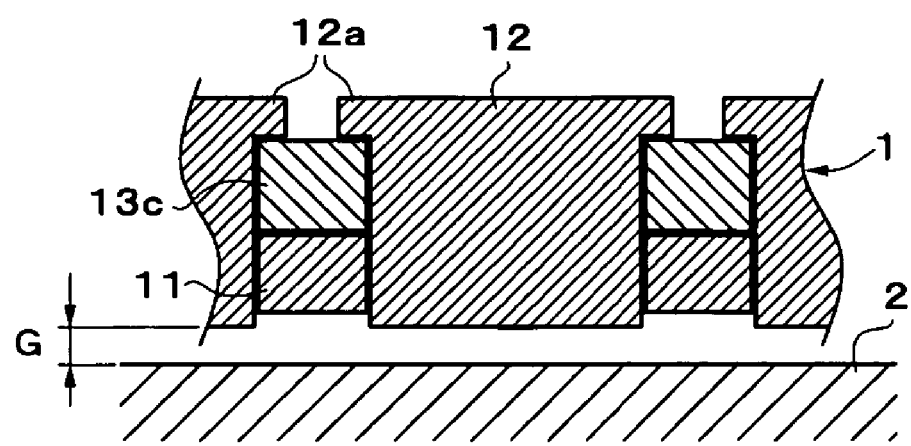
FIG. 13 is a partial sectional view of the structure of the rotor of the rotating electrical machine.

Next, a fourth exemplary embodiment will be described with reference to FIGS. 11 to 13. FIG. 11 shows a representational cross section of a rotating electrical machine. FIG. 12 is an exploded perspective view of the structure of a rotor. FIG. 13 shows the structure of part of the cross section of the rotor expanded on a plane. The rotating electrical machine in this exemplary embodiment is a double rotor type rotating electrical machine which includes a pair of rotors 1 in which are arranged permanent magnets 11 and cores 12, and a stator 2 with back-to-back end surfaces which face, across an air gap in the axial direction, opposing end surfaces of the rotors, as shown in FIG. 11.

Both of the rotors 1 have a support member 13 which supports, by insertion, a plurality of separated cores 12 and connects them to a rotating shaft 10. The permanent magnets 11 are attached to the support member 13 between the cores 12 in the circumferential direction of the rotor and oriented such that their magnetic poles face in the circumferential direction of the rotor (i.e., in a direction perpendicular to the paper in FIG. 11). The support member 13 has an annular portion 13b which supports the outer periphery of the cores 12 in order to prevent the cores 12 from flying outward due to the centrifugal force that acts on them.

The support member 13 has spoke portions 13c which connect the annular portion 13b and a hub portion 13a which fits onto the rotating shaft 10 together. As shown in FIG. 12, the spoke portions extend radially in spaces in the radial direction of the rotor which are surrounded by adjacent cores 12 and the permanent magnet 11 disposed between those cores 12, thus ensuring that adjacent cores 12 do not contact one another.

In other words, the support member 13 has spoke portions 13c which connect the annular portion 13b and a hub portion 13a which fits onto the rotating shaft 10 together. The permanent magnets 11 are arranged along these spoke portions 13c, and the cores 12 are arranged separated from one another in the spaces surrounded by the hub portion 13a, the spoke portions 13c, and the annular portion 13b.

In this exemplary embodiment, the cores 12 are provided with retaining portions 12a which abut against the support member 13 at the back sides of the surfaces of the support member 13 that face the stator 2 in order to prevent the cores 12 from slipping out in the direction that would reduce the air gap G, due to the attraction force of the stator 2 acting on the cores 12. The permanent magnets 11 are attached to surfaces of the spoke portions 13c on the side facing the stator 2.

Next, the detailed structure of each portion will be described further. Referring to FIG. 11, the case 3 which houses the rotors 1 and stator 2 rotatably supports, via bearings 6, both ends of the rotating shaft 10 onto which fits the support member 13 of the rotors 1.

When viewed in the axial direction, the stator 2 is, on the whole, annular, with segments equal to the desired number of poles, in which coils 22 are wound around substantially fan-shaped cores 21, aligned in the circumferential direction. The stator 2 is mounted to, and supported by, the case 3 via a plate-shaped support member 23. In FIG. 11, the cores 21 of the stator 2 are made of thin electromagnetic steel sheets laminated in either the circumferential or radial direction, or are molded products of soft magnetic composite material.

The pair of rotors 1 includes permanent magnets 11 corresponding to the number of poles, the same number of cores 12, and a support member 13 which supports the permanent magnets 11 and the cores 12, as shown in FIG. 12. The permanent magnets 11 are not particularly limited to the shape shown in the drawing, but in this example, they are rod-shaped with rectangular cross-sections and arranged on the front surfaces of the spoke portions 13c of the rotor support member 13, i.e., on the surfaces of the spoke portions 13c that are on the side facing the stator, and oriented such that their length is in the radial direction (i.e., the radial direction of the stator). When the permanent magnets are arranged in this way, the spoke portions 13c are able to be arranged in positions separated, in the axial direction by a distance equal to the thickness of the permanent magnets, from the air gap between the stator and the rotor. The closer the position of a member to the air gap, the more likely an eddy current is to be generated in that member, which would lead to a decrease in motor efficiency. Dividing the permanent magnets makes it possible to keep the eddy current generated inside low, but the spoke portions 13c cannot be divided because they connect the hub portion 13a with the annular portion 13b. Therefore, in the foregoing structure, the eddy current generated inside the spoke portions 13c can be reduced by distancing the spoke portions 13c from the air gap, which is effective in preventing a decrease in motor efficiency.

The cores 12 are made of either laminated electromagnetic steel sheets or soft magnetic pulverized material. They are substantially fan-shaped when viewed in the axial direction, and are thicker in the axial direction than the thickness of the permanent magnets 11 and the spoke portions 13c of the support member 13 combined. Retaining portions 12a which abut against the support member 13 are formed on the end surfaces of the cores 12 on the side of the cores 12 that is opposite the side facing the cores 21 of the stator 2 (i.e., the retaining portions 12a are formed on the back sides of the cores 12 that are farther away from the cores 21 of the stator 2). These retaining portions 12a are protrusions which extend out from each core 12. The structure shown in FIG. 11 is representational so these protrusions are shown extending out in the radial direction in a manner different from the other drawings, but they may actually extend out in the radial direction of the rotor and abut against the end surfaces of the hub portion 13a and the annular portion 13b of the support member, or they may extend out in the circumferential direction of the rotor and engage with the spoke portions 13c of the support member 13, as shown in FIGS. 12 and 13. Furthermore, each of these protrusions may be one continuous protrusion, as shown in FIG. 12, a partial protrusion (i.e., protruding only at a specific area), or a series of intermittent protrusions. In order to reduce the number of magnetic flux short-circuits from the retaining portions, it is particularly effective to provide protruding retaining portions that extend out from the cores in the radial direction of the rotor so as to abut in the axial direction against the support member on the inner radial side and the outer radial side, as shown in the representational sectional view in FIG. 11.

The support member 13 is made from a nonmagnetic metal and includes, in an integrated fashion, the hub portion 13a which is a portion that fits onto the rotating shaft 10, the annular portion 13b that contacts the outer peripheral side of the permanent magnets 11 and the cores 12, and spoke portions 13c which connect the hub portion 13a with the annular portion 13b. The hub portion 13a extends a predetermined length on one side in the axial direction from the portion where it connects with the spoke portions 13c in order to prevent the surfaces of the rotors that face the air gap from wobbling. Although not shown in the drawing, the hub portion 13a is fixed to the rotating shaft 10 by a rotation stopping mechanism such as spline engagement. The annular portion 13b is wider in the axial direction than the spoke portions which are the thinnest portions of the support member, and is of a thickness necessary to maintain strength.

The spoke portions 13c extend in the radial direction from the outer periphery of the hub portion 13a, thereby forming spaces into which the fan-shaped cores are inserted between the outer periphery of the hub portion, the inner periphery of the annular portion, and the surfaces of adjacent spoke portions in the circumferential direction. The position of the spoke portions 13c in the axial direction is, with respect to the width of the annular portion 13b in the axial direction, toward the side of the annular portion 13b that is farther away from the surface that faces the stator. The spoke portions 13c are offset in this way to ensure space for arranging the permanent magnets on the side of the spoke portions 13c that faces the stator 2.

The permanent magnets 11, the cores 12, and the support member 13 structured in this way make up the integrated rotor 1 by fitting the cores 12 in the fan-shaped spaces until their retaining portions 12a abut against the back surfaces of the spoke portions, fitting the permanent magnets 11 in the spaces formed between adjacent cores 12 and the front surfaces of the spoke portions 13c, and attaching them to the cores 12 or the spoke portions 13c or both.

The rotor cores 12 are made of either laminated steel sheets or are molded products of soft magnetic composite material as described above. Soft magnetic composite material in this case is not as strong but is effective because it enables the eddy current to be reduced. Laminated steel sheets, on the other hand, are extremely strong but when they are laminated in the axial direction in an axial gap motor, as they are in a radial gap motor, they are ineffective at reducing the eddy current, so they must be laminated in either the circumferential or radial direction. Lamination can be done using any of various methods.

Figure 14:
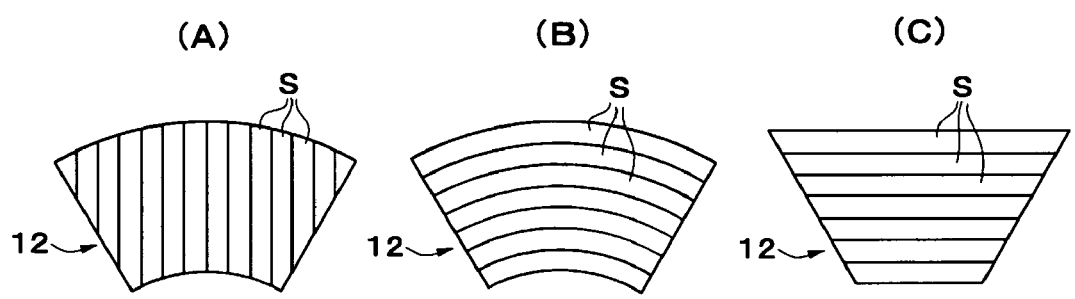
FIG. 14 is a representational front view of various laminated rotor core structures.

Next, FIG. 14 shows representational examples of a specific structure when the rotor cores 12 are of a laminated construction. With this structure, flat electromagnetic steel sheets S may be laminated together in substantially the circumferential direction of the rotor, as shown in FIG. 14(A), electromagnetic steel sheets S which are curved in a circular fashion may be laminated together in the radial direction of the rotor or flat electromagnetic steel sheets may be laminated together and then curved in the circumferential direction, as shown in FIG. 14(B), or flat electromagnetic steel sheets S of different lengths may be laminated together to form a structure which is substantially fan-shaped such that the direction of lamination is the same as the radial direction of the rotor, as shown in FIG. 14(C).

Figure 15:
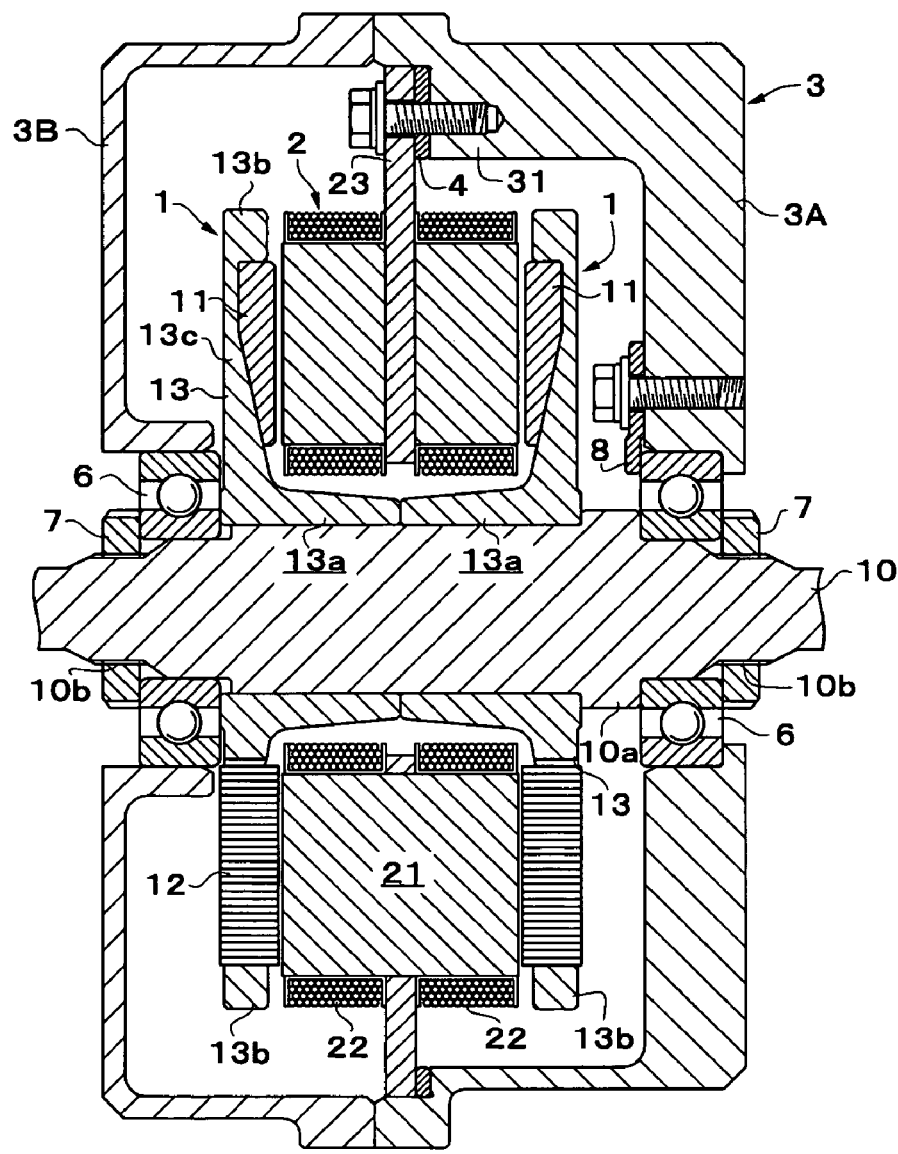
FIG. 15 is a sectional view of a structure of a modified example of the rotating electrical machine according to the first exemplary embodiment.

Next, FIG. 15 shows a sectional view of a more detailed example of the structure according to the fourth exemplary embodiment. In this example, the case 3 is formed of two case portions. One case portion 3A has a mounting portion 31 which extends in the inner radial direction from the peripheral wall of the case portion 3A and has a mounting reference surface for fixing the stator 2. The case portion 3A also has a bearing housing portion on the inside in the radial direction of an end wall. The other case portion 3B covers the open end side of the case portion 3A, and has a cylindrical bearing housing portion that extends into the case on the inside in the radial direction of an end wall.

The stator 2 is mounted to, and supported by, a plate-shaped support member 23. The support member 23 has a plurality of bolt through-holes on its outer peripheral side. Tightened bolts are used to fix the support member 23 to the mounting portion 31 of the one case portion 3A, with a shim 4 sandwiched in between the two which adjusts the axial position of the support member 23, and therefore the stator 2, with respect to the pair of rotors 1.

As in the first exemplary embodiment, the integrated pair of rotors 1 is fit onto the rotating shaft 10 with the hub portions which extend in the axial direction facing one another. The length in the axial direction of both of the hub portions 13a combined creates a predetermined gap between the opposing end surfaces of the inserted rotor cores 12 and the back-to-back end surfaces of the stator cores 21. Therefore, in this example, the hub portions 13a act as mechanisms that maintain the distance between the pair of rotors 1.

The rotor shaft 10 which supports the pair of rotors 1 is such that a circumferential surface portion onto which the hub portions 13a of the support member 13 fit is slightly larger in diameter than the bearing support portion for the case 3. Further, the rotor shaft 10 is provided with a collar 10a on one end of the large diameter shaft portion. This collar 10a is positioned such that one end surface thereof abuts against the inner race of the bearing 6, and the other end surface thereof abuts against the support member 13 of the rotor 1. The length of the large diameter shaft portion in the axial direction is set slightly shorter than the combined length, in the axial direction, of both hub portions 13a. Although not shown in the drawing, a rotation stopping mechanism such as splines is provided on the outer peripheral surface of the large diameter shaft portion such that, by engagement of this rotation stopping mechanism with a rotating stopping mechanism such as splines formed on the inner peripheral surface of the hub portions 13a, the pair of rotors 1 and the rotating shaft 10 can transmit torque without rotating relative to one another.

The rotating shaft 10 is supported by the case 3 via a pair of angular ball bearings 6. This rotating shaft 10 is positioned with respect to the case portion 3A by abutting the collar 10a against the inner race of one of the bearings, as described above.

The rotating shaft 10 is also provided with threaded portions 10b for screwing on nuts on the outside of the bearing fitting portion. In addition, a screw hole for fastening a bolt is formed in the end wall of the one case portion 3A. A retaining bracket 8 which holds an outer race of one of the bearings 6 to the case portion 3A is bolted to the case portion 3A with a bolt via the screw hole.

The characteristic of this example is that the permanent magnets 11 decrease in thickness in the axial direction toward the inside in the radial direction of the rotors 1, and that the spoke portions 13c of the support members 13 increase in thickness in the axial direction toward the inside in the radial direction of the rotors 1.

According to this structure, the section modulus of the spoke portions toward the inside in the radial direction can be increased, which is advantageous in that it makes it possible to increase the rigid strength of the spoke portions overall and therefore further reduce wobbling of the surfaces of the rotors that oppose the air gap.

Moreover, with this structure it is possible to reduce the magnet amount (volume) on the inner radial side so that it is less than the outer radial side. The magnet amount is able to be reduced on the inner radial side for two reasons. First, force generated between the permanent magnets and the stator contributes less to the motor torque in locations where the radius from the rotating shaft is smaller (i.e., contributes less the closer the location is in the radial direction to the rotating shaft). Therefore, by making the magnet amount on the outer radial side relatively large and the magnet amount on the inner radial side relatively small, the torque output with respect to the magnet amount of the motor on the whole can be increased. Second, the amount of magnetic flux that leads to magnetic saturation of the cores is increasingly smaller toward the inner radial side. Therefore, by reducing the magnet amount (i.e., reducing the magnetic flux generated by the magnets) on the inner radial side so that it is less than it is on the outer radial side, it is possible to generate as large a magnetic flux as possible, yet one that is equal to, or less than, the permissible amount of magnetic flux that will lead to magnetic saturation on both the inner and outer radial sides. The reason that magnetic saturation tends to occur more on the inner radial side is as follows. The cores of the rotors and the stators are fan-shaped when viewed from the axial direction, so the length of the arc of the fan is smaller toward the inner radial side. The magnetic flux from the permanent magnets passes in the axial direction across the air gap from the rotor cores to the stator cores. That is, the entire fan-shaped surface is the magnetic path, so when the length of the fan-shaped arc decreases toward the inner radial side, it means that the sectional area of the magnetic path per unit length in the radial direction decreases. The smaller the sectional area of the magnetic path, the smaller the amount of magnetic flux that leads to magnetic saturation.

With the fourth exemplary embodiment described in detail above, a compact rotor structure is able to be obtained that integrates the permanent magnets 11 and the rotor cores 12, which are divided into the same number as there are poles, by a support member 13 without a back yoke and connects them to the rotating shaft 10. Further, by connecting the annular portion 13b of the outer periphery of the support member to the hub portion 13a by the spoke portions 13c, there is no longer a need for a back yoke shaped portion that adds more thickness to the thickness of the cores 12 in the axial direction, so the thickness of the rotors 1 does not have to be any thicker than the thickness of the cores 12. Further, the annular portion 13b retains the rotor outer peripheral sides of the rotor cores 12 and the permanent magnets 11, thus making it possible to prevent the rotor cores 12 and the permanent magnets 11 from flying out due to centrifugal force without relying on adhesive force to attach the rotor cores 12 and the permanent magnets 11 to the support member 13. Moreover, the retaining portions 12a are provided on the cores 12, which makes it possible to reliably maintain the air gap by structurally preventing the cores 12 of the rotors 1 from being pulled in a direction that would close the air gap due to the attraction force of the stator 2, also without relying on adhesive force.

[Fifth Embodiment]

Figure 16:
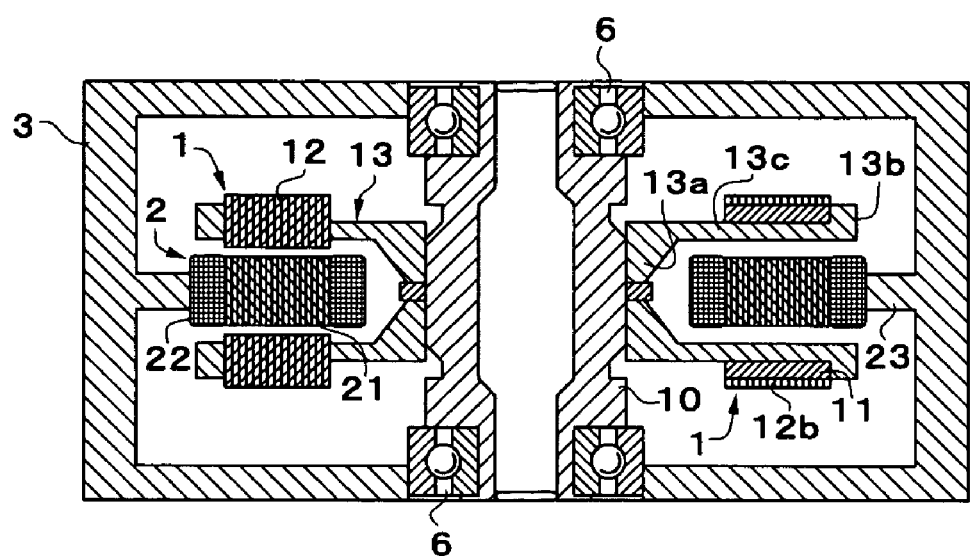
FIG. 16 is a representational sectional view of the structure of the rotating electrical machine according to the second exemplary embodiment.
Figure 17:
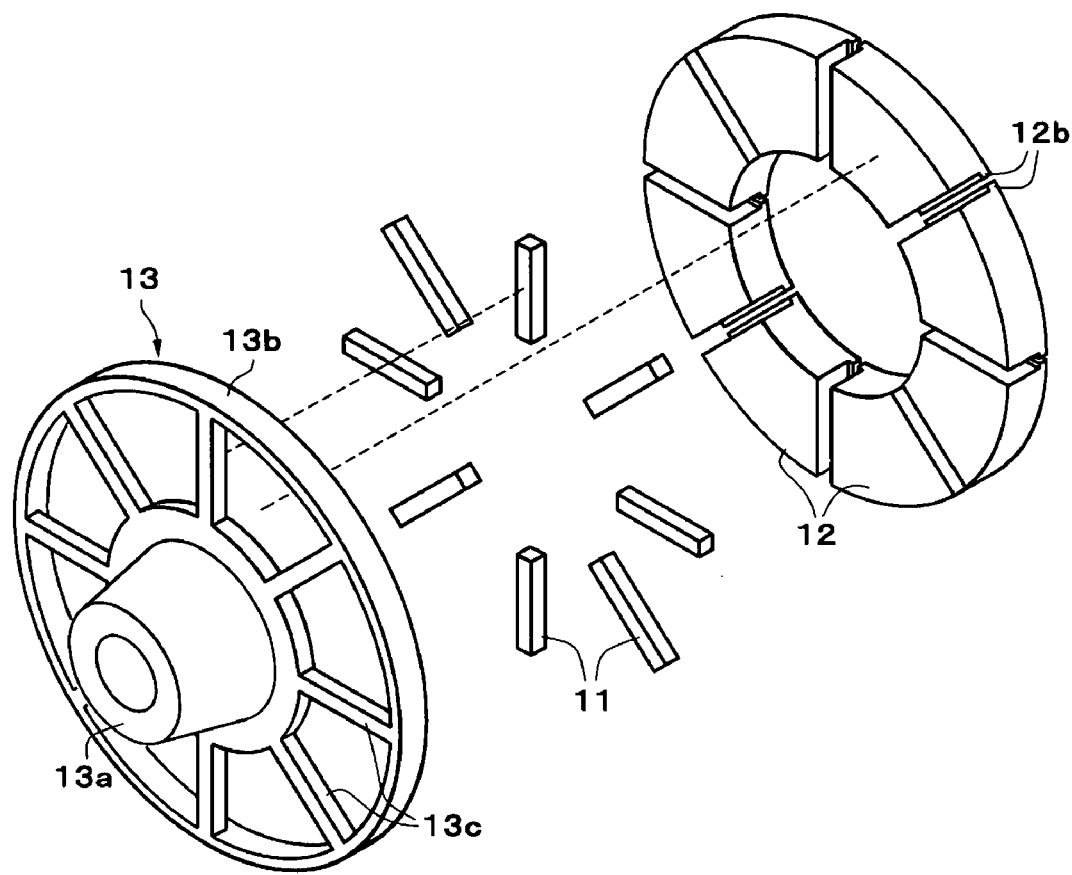
FIG. 17 is an exploded perspective view of the structure of the rotor of the rotating electrical machine.
Figure 18:
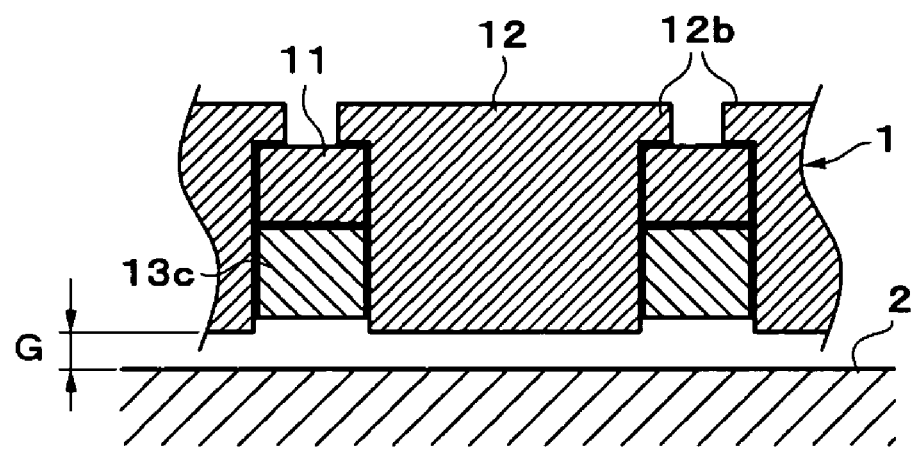
FIG. 18 is a partial sectional view of the structure of the rotor of the rotating electrical machine.

Next, according to a fifth exemplary embodiment shown with reference to FIGS. 16 to 18, in contrast with the fourth exemplary embodiment, the permanent magnets 11 are attached to back sides of the surfaces of the spoke portions 13c that face the stator 2, and the cores 12 are provided with retaining portions 12b that abut against the back sides of the surfaces of the permanent magnets 11 that are attached to the spoke portions 13c in order to prevent the cores 12 from slipping out in a direction that would reduce the air gap due to the attraction force of the stator 2 acting on the cores 12. In this example as well, all of the structural elements forming the rotating electrical machine are the same as those in the first exemplary embodiment, with the exception of the detailed structure of the support member 13. Therefore, in the following description of the structural elements, corresponding elements will be denoted by like reference numerals and only the differences in the detailed structure of the support member 13 and the positional relationships will be described.

Referring to FIG. 17, the support member 13 in this example differs from the support member in the fourth exemplary embodiment in that the position of the spoke portions 13c in the axial direction is, with respect to the width of the annular portion 13b in the axial direction, toward the side that is closer to the surface that faces the stator 2. The spoke portions 13c are positioned in this way to both ensure space for arranging the permanent magnets on the back sides of the surfaces of the spoke portions 13c that face the stator 2, as well as to prevent the permanent magnets 11 from flying out in the radial direction of the rotor due to centrifugal force.

In this example, the permanent magnets 11, the cores 12, and the support member 13 make up the integrated rotor 1 by attaching or adhering the permanent magnets 11 to the spoke portions 13c, fitting the cores 12 in the aforementioned fan-shaped spaces until their retaining portions 12b abut against the permanent magnets 11, and fixing them to the support member 13 by a suitable mechanism such as adhesion.

At this time, the retaining portions 12b of the cores 12 are formed as protrusions which extend out in the circumferential direction of the rotor. As a result, these protrusions abut in the axial direction against the permanent magnets 11 which are adjacent in the circumferential direction to the cores 12. Furthermore, when a structure is employed in which the cores 12 are laminated in the radial direction of the rotor, as shown in FIG. 14(B) or FIG. 14(C), cores can easily be produced which have protrusion-shaped retaining portions that extend out in the circumferential direction of the rotor by molding each electromagnetic steel sheet into a convex shape, when viewed in the radial direction of the rotor, and then laminating them together.

In the fifth exemplary embodiment, the same effects as those achieved by the fourth exemplary embodiment can be achieved. Also, in the fifth exemplary embodiment, the permanent magnets 11 are sandwiched between the spoke portions 13c and the retaining portions 12b of the cores 12, which is advantageous in that the permanent magnets 11 can be more strongly and reliably fixed to the rotor support member 13 than they can in the structure of the first exemplary embodiment.

The present invention can be applied to motors, generators, or motor-generators for a variety of uses, but is particularly effective when used in motors or generators for uses which severely restrict the axial dimensions of the rotating electrical machine, such as a wheel motor housed in a wheel in an electric vehicle, or a motor or generator that is arranged either on the same axis, or on a parallel axis, with an engine in a drive unit of a hybrid vehicle in which the engine is transverse mounted.

What is claimed is:

1. An axial gap electrical rotary machine comprising a rotor and a stator axially opposing each other across an air gap, wherein the rotor comprises permanent magnets and cores, wherein each of the permanent magnets is oriented with magnetization surfaces respectively defining north and south poles and facing in the circumferential direction of the rotor, wherein like poles of adjacent permanent magnets face each other across a core, wherein the cores are arranged alternately with the permanent magnets around the circumference of the rotor, and wherein the amount of magnetic flux increases radially outward from the inner periphery of the rotor to the outer periphery of the rotor.

2. An axial gap electrical rotary machine according to claim 1, wherein the permanent magnets each have a sectional area which increases from the inner periphery of the rotor to the outer periphery of the rotor.

3. An axial gap electrical rotary machine according to claim 1, wherein the permanent magnets each have a magnetomotive force which increases radially from the inner periphery of the rotor to the outer periphery of the rotor.

4. An axial gap electrical rotary machine according to claim 1, wherein the permanent magnets each have a magnetic flux density at the magnetization surfaces which increases from the inner periphery of the rotor to the outer periphery of the rotor.

5. An axial gap electrical rotary machine according to claim 1, wherein the axial thickness of the permanent magnets increases from the inner periphery of the rotor to the outer periphery of the rotor.

6. An axial gap electrical rotary machine according to claim 1, wherein the permanent magnets each have a circumferential dimension which increases from the inner periphery of the rotor to the outer periphery of the rotor.

7. An axial gap electrical rotary machine according to claim 1, wherein the amount of magnetization of each of the permanent magnets increases radially from the inner periphery of the rotor to the outer periphery of the rotor.

8. An axial gap electrical rotary machine according to claim 2, wherein the axial thickness of the permanent magnets increases from the inner periphery of the rotor to the outer periphery of the rotor.

9. An axial gap electrical rotary machine according to claim 3, wherein the permanent magnets each have a circumferential dimension which increases from the inner periphery of the rotor to the outer periphery of the rotor.

10. An axial gap electrical rotary machine according to claim 4, wherein the amount of magnetization of each of the permanent magnets increases radially from the inner periphery of the rotor to the outer periphery of the rotor.

11. An axial gap electrical rotary machine according to claim 1, wherein the magnetic flux density in the cores of the rotor is substantially constant radially of the rotor.

* * * * *